United States Patent Office 3,085,097
Patented Apr. 9, 1963

3,085,097
α-CYANO, 2-ALKOXY-1-NAPHTHALENE-
ACRYLIC ACID ESTERS
Albert F. Strobel, Delmar, and Sigmund C. Catino, Castleton, N.Y., assignors to General Aniline & Film Corporation, New York, N.Y., a corporation of Delaware
No Drawing. Filed Mar. 9, 1960, Ser. No. 13,720
9 Claims. (Cl. 260—347.4)

This invention relates to new and useful α-cyano-2-alkoxy-1-naphthalene acrylic esters and to processes for preparing same.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will cause them to spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency problem may not be paramount.

We have discovered a class of compounds which are not only compatible with a great number of film-forming plastics, resins, gums, waxes and the like, but which, further, exhibit outstanding ultra-violet absorbing properties within the generally encountered ultra-violet region of 250 to 400 millimicrons. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful 2-alkoxy-α-cyano-1-naphthaleneacrylic esters.

It is a still further object of this invention to provide new and useful 2-alkoxy-α-cyano-1-naphthaleneacrylic esters exhibiting outstanding ultra-violet properties.

It is another object of this invention to provide processes for the preparation of new and useful ultra-violet absorbing compounds.

It is still another object of this invention to provide processes for the preparation of new and useful 2-alkoxy-α-cyano-1-naphthaleneacrylic esters.

Other objects and advantages will appear hereinafter as the description proceeds.

The new and useful compounds of this invention are characterized by the following general formula:

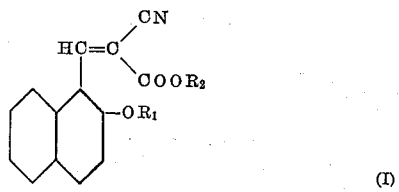

(I)

wherein $R_1$ is a lower alkyl of from 1 to 9 carbon atoms, as, for example, methyl, ethyl, propyl, isopropyl, butyl, isobutyl, amyl, hexyl heptyl octyl isoocyl nonyl and the like and $R_2$ is hydroxy alkyl, halo alkyl, cyano alkyl, alkoxy alkyl, hydroxy alkoxy alkyl, carbalkoxy alkyl, aryl, substituted aryl, hetero and the like.

The following specific substituents for $R_2$ may be employed in the above generic formulation:

Cyanoethyl
Cyanopropyl (N-propyl, isopropyl)
Cyanobutyl (N-butyl, isobutyl, etc.)
Cyanoamyl
Cyanohexyl
Cyanodecyl
Cyanolauryl, and the like.
Hydroxyethyl
Hydroxypropyl (N-propyl, isopropyl)
Hydroxybutyl (N-butyl, isobutyl, etc.)
Hydroxyamyl
Hydroxyhexyl
Hydroxydecyl
Hydroxylauryl, and the like.
Chloroethyl
Chloropropyl (N-propyl, isopropyl)
Chlorobutyl (N-butyl, isobutyl, etc.)
Chloroamyl
Chlorohexyl
Chlorodecyl
Chlorolauryl, and the like.
Bromoethyl
Bromopropyl (N-propyl, isopropyl)
Bromobutyl (N-butyl, isobutyl, etc.)
Bromoamyl
Bromohexyl
Bromodecyl
Bromolauryl, and the like.
Methoxyethyl
Methoxypropyl (N-propyl, isopropyl)
Methoxybutyl (N-butyl, isobutyl, etc.)
Methoxyamyl
Methoxyhexyl
Methoxydecyl
Methoxylauryl, and the like.
Ethoxyethyl
Ethoxypropyl, (N-propyl, isopropyl)
Ethoxybutyl (N-butyl, isobutyl, etc.)
Ethoxyamyl
Ethoxyhexyl Ethoxydecyl
Ethoxylauryl, and the like.
Polyhydroxyalkyl, e.g., glyceryl
Heterocyclics:
    Furyl
    Tetrahydrofurfuryl
    Benzofuryl
    Thienyl
    Pyrrl
    Pyrollidyl
    2-pyrollidonyl
    Indolyl
    Carbazolyl
    Oxazolyl
    Thiazolyl
    Pyrazolyl
    Pyridyl
    Pyrimidyl
    Quinolyl, and the various alkyl, alkoxy, halo, nitro, carboxy, carboxalkoxy, acyl, and acylamino derivatives of the aforementioned heterocyclic radicals
Aryls:
    Phenyl
    α-Naphthyl, β-naphthyl
    α-Anthracyl, β-anthracyl, γ-anthracyl
    Cumyl
    Tolyl
    Phenanthranyl
    Anisole
    Phenetole
    p-Diethoxyphenyl
    1-methoxy phenanthryl
    β-Naphthyl methyl ether
    β-Naphthyl ethyl ether
    Hydroxyethyl phenyl
    Hydroxypropyl phenyl
    p-Hydroxyethyl naphthyl
    Chlorophenyl
    Bromophenyl
    1,2-dichlorophenyl
    1,3-dichlorophenyl
    1,3,5-trichlorophenyl
    1,2-dibromophenyl
    o-Chlorotolyl
    m-Chlorotolyl
    m-Bromotolyl
    Bromo-o-xylyl
    α,β-dichloro naphthyl
    4-bromoacenaphthyl
    Nitrophenyl
    o-Nitrotolyl
    p-Nitrotolyl
    4-nitroacenaphthyl
    3-nitrophenanthryl
    Carboxyphenyl
    Carboxytolyls
    Carboxyxylyls
    Carbalkoxyphenyls, e.g., carbomethoxyphenyl, carboethoxyphenyl
    Carbalkoxytolyls, e.g., carbomethoxytolyls
    Acetophenyl
    Propiophenyl
    Butyrophenyl
    Lauroylphenyl
    p-Acetotolyl
    Benzoyl naphthyl
    Acetaminophenyl
    Acet-methylamino phenyl
    Acetoaminotolyls
    Acetoaminonaphthyls
    Propio-aminophenyl
    Propio-aminotolyls In addition, $R_2$ may represent a substituent of the formula:

$$R_3X$$

wherein X is Formula I devoid of the $R_2$ substituent and $R_3$ is a bridging group which may be alkylene, substituted alkylene, arylene, substituted arylene or heterocylic, e.g., $$-CH_2CH_2-;\ -CH_2CH_2CH_2-$$
$$-CH_2CH_2CH_2CH_2-;\ -CH_2CH_2CH_2CH_2CH_2-$$

[Structural formulas of various bridging groups including phenylene-methylene, cyclohexyl-methylene, branched alkylenes with methyl substituents, naphthyl and anthryl containing bridges, and heterocyclic bridges containing oxygen, nitrogen, and carbonyl groups]

thereby giving rise to bis-products of the formula:

[Structure II showing bis-product with two naphthyl groups bearing OR₁ substituents connected via C=C(CN)COOR₂—OOC(CN)C=C bridge]

(II)

wherein $R_1$ and $R_3$ have the meanings designated above.

The general method for the preparation of compounds of Formula I involves a condensation of the selected 2-alkoxy-1-naphthaldehyde with the desired α-cyanoacetic acid ester in the presence of a secondary aliphatic amine such as piperidine as a catalyst. The general reaction of aldehydes with active methylene containing compounds to give methine condensation products upon the elimination of water is well known, and the above described general method for the preparation of compounds of Formula II is carried out in a similar manner. In addition to piperidine, other bases which may be used may include the following:

Diethylamine
Di-n-propylamine
Cyclohexylamine
Morpholine
Diethanolamine, and the like The usual procedure involves heating a mixture of the reactants in the presence of the basic catalyst at elevated temperatures until the reaction has gone to completion. A solvent may be employed to effect miscibility of the reactants and when such a solvent is used, the temperature of the reaction will usually be the reflux temperature of the solvent solution of the ingredients. Ethyl alcohol is the preferred solvent in such reaction. In the absence of a solvent, temperatures of the order of 75 to 150° C. may be used. The time of reaction will of course vary depending upon the specific reactants and the temperature used. In some instances a relatively low temperature for a short period of time effects the formation of a substantially quantitative yield of the desired ester. In other cases, longer times and higher temperatures are necessary to get the best yields. It is of course again obvious to one skilled in the art to ascertain for any given combination of reactants the most efficacious combination of temperature and time.

Upon the completion of the esterification reaction, the desired ester is isolated, usually by evaporation of the volatile constituents, namely, water which is liberated in the condensation reaction, any alcohol which may be employed as a solvent, and the basic catalyst where the latter is a liquid and normally and readily removable by distillation or volatilization. It is also possible in certain instances, to isolate the desired ester product by diluting the reaction mixture with a solvent which precipitates out the ester. Thus, methanol may be employed in many cases as such a diluent, and the resultant slurry is then filtered at low temperatures (0 to 5° C.) to separate the crystalline product.

The compounds of the general Formula II above are prepared in a similar manner except that instead of employing cyanoacetic acid derivatives containing a single active methylene grouping, one employs a polycyanoacetate of a polyhydric alcohol using 2 mols of the aldehyde for each mol of the polycyanoacetate, thereby giving rise to the best compounds of Formula II. The polycyanoacetates are, of course, first prepared, and usually in the manner described in U.S. Patent 2,426,056, from the corresponding polyhydric alcohol and cyanoacetic acid in the presence of an acidic catalyst.

The following examples will serve to illustrate the present invention and uses thereof, without being deemed limitative thereof.

EXAMPLE 1

Preparation of

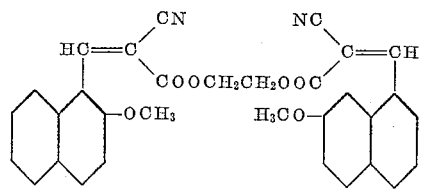

Ethylene glycol di-(α-cyanoacetate) is first prepared according to the method described in Example 1 of U.S. Patent 2,426,056 using excess cyanoacetic acid. One molecular equivalent of the crude product isolated is condensed with 372 g. (2 molecular equivalents) of 2-methoxy-1-naphthaldehyde in the presence of 10 gms. piperidine, boiling for 3 hours with 1 liter of ethyl alcohol as solvent. The alcohol and piperidine are evaporated and the ultra-violet absorber so isolated is used in the crude state in Polylite 8000 as follows:

EXAMPLE 2

The resin is prepared by adding 1 gm. of a 50% solution of benzoyl peroxide in tricresyl phosphate to Polylite 8000.

0.25 gm. of the above ultra-violet absorber is then added to 100 gms. resin. A clear casting of polyester is made between glass plates spaced ¼ in. apart. The resin is cured by placing the material in an oven at 65° C., then raising the temperature slowly to 90° C., holding 1 hour, then raising temperature to 125° C. and holding 1 hour to complete the cycle. The resultant sheet is more stable to sunlight than a similar sheet devoid of the absorber.

EXAMPLE 3

Preparation of

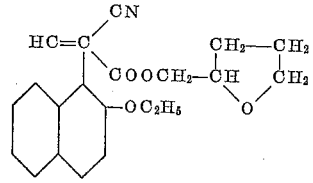

The intermediate

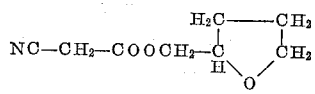

is first prepared:

170 gms. (2 moles) of cyanoacetic acid is mixed with 222 gms. (2.2 moles) of tetrahydrofurfuryl alcohol, 300 mls. chloroform, and 10 gms. of a mixed alkane sulfonic acid catalyst in a 1-liter flask equipped with condenser and water separator. The material is heated under reflux on a steam bath until no more water is taken off. The product is treated with 20% (wt./vol.) sodium hydroxide and washed until neutral to delta paper. The product is extracted with chloroform, dried, solvent removed, and distilled at 140°–144° C. at 0.5 mm. Yield=58%. This intermediate (0.37 mole) is then condensed with 0.37 mole of 2-ethoxy-1-naphthaldehyde in the following manner: A mixture of 0.37 mole of the aldehyde, and 0.37 mole of the intermediate above prepared, with 0.01 mole of piperidine is stirred for 1 hour at 95° C. The reaction mixture is then allowed to cool to 60° C. and diluted with 120 mls. of methanol. A slurry is produced, which slurry is filtered at 3° C. to separate the crystalline product. The filter cake is then washed with 100 mls. of methanole and air dried at room temperature.

EXAMPLE 4

The product of Example 3 is applied to polyethylene as follows:

0.5 gm. ultra-violet absorber of Example 3
99.5 gms. polyethylene wax PT 95504 (Semet-Solvay)

are melted at 120° C. to give a solution. The material is then pressed out in a Carver press to give a film of about ⅛ in. thickness. Meat stored behind the film containing absorber is less discolored on exposure to light than meat stored behind similar film prepared without absorber.

EXAMPLE 5

Preparation of

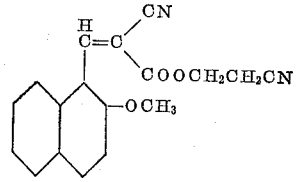

One mole of 2-methoxy-1-naphthaldehyde is condensed with one mole of cyanoethylcyanoacetate in the presence of 0.05 mole of piperidine employing 800 ml. of ethyl alcohol as a solvent. The condensation is effected by refluxing the mixture for 2 hours. After the reaction is complete, the reaction mass is cooled to 40° C. and diluted with 1 liter of methanol. A slurry forms; this is filtered at 0° C. and a crystalline product is isolated.

The product of this example is tested for its ultra-violet absorbing characteristics and is found to be outstanding. The following Example 6 demonstrates the application of the compound of this example to Dacron fibers.

EXAMPLE 6

The product of Example 5 is applied to "Dacron" (ethylene glycol-terephthalic acid polyester) fiber as follows:

A 10 gms. swatch of Dacron fiber is heated at 205° F. for 1 hour in a water bath containing 300 mls. water and 0.3 gm. of the above ultra-violet absorber dispersed with 0.3 gm. of nonylphenol condensed with 12 moles of ethylene oxide. The 0.3 gm. of absorber is dissolved first in 5 mls. of alcohol and the alcohol solution is poured into the 300 mls. of water containing the emulsifier. The cloth is removed, rinsed and dried. Cloth so treated shows more stability toward discoloration on exposure to light than untreated cloth.

EXAMPLE 7

*Preparation of*

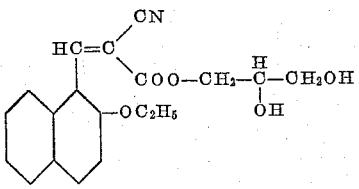

The mono-glyceryl ester of cyanoacetic ester is first prepared as follows:

94 gms. (1 mole) of cyanoacetic acid (90% pure)
184 gms. glycerol (2 moles)
13.9 gms. of toluenesulfonic acid
200 mls. benzene are refluxed together for 24 hours.

The water liberated during the reaction is removed with a water trap [18 mls. (1 mole) of water collected]. The catalyst is neutralized with sodium bicarbonate solution. The material is saturated with NaCl and then extracted with ethyl acetate. The ethyl acetate extract is dried with anhydrous sodium acetate and the solvent is distilled off, leaving the light brown oil of

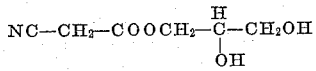

2-ethoxy-1-naphthaldehyde is condensed with the above glyceryl ester of cyanoacetic acid as in Example 1, employing the same molar amounts of reactants to give the ultra-violet absorber.

EXAMPLE 8

A cellulose acetate film containing 1% of the ultra-violet absorber of Example 7 is prepared from a "dope" of the following composition: 3.5 g. ethanol, 6.5 g. methyl Cellosolve (ethyleneglycol monomethyl ether), 9.0 g. ethyl acetate, 3.75 g. cellulose acetate, 210 g. acetone. A similar film without absorber is also prepared. The film containing the ultra-violet absorber gave outstandingly better protection against darkening of meat stored behind it than the film free of absorber upon exposure of each to daylight for several days.

EXAMPLES 9–22

In the following examples, 2-ethoxy-1-naphthaldehyde is condensed with the designated cyanoacetate compound in the manner described in Example 3.

| Example | Cyanoethyl Compound |
| --- | --- |
| 9 | CNCH₂COOCH₂CH₂Cl |
| 10 | CNCH₂COOCH₂CH₂Br |
| 11 | CNCH₂COOCH₂CH₂OCH₃ |
| 12 | CNCH₂COOCH₂CH₂OCH₂CH₃ |
| 13 | CNCH₂COOCH₂CH₂OCH₂CH₂OH |
| 14 | CNCH₂COOCH₂CH₂OCH₂CH₂OH |
| 15 | CNCH₂COOCH₂CH₂OCH₂CH₂COOCH₃ |
| 16 | CNCH₂COO-phenyl |
| 17 | CNCH₂COOCH₂-phenyl |
| 18 | CNCH₂COO—⟨phenyl⟩—Cl |
| 19 | CNCH₂COO—⟨phenyl⟩—OCH₃ |
| 20 | CNCH₂COO—⟨phenyl⟩—NHCOCH₃ |
| 21 | CNCH₂COO—⟨naphthyl⟩—NHCOCH₃ |
| 22 | CNCH₂COO—⟨naphthyl⟩ |

(Note: The Cyanoethyl Compound column, rows 9–17, uses CNCH₂COO... format as written. Rows 18–22 are drawn with aromatic ring structures.)

EXAMPLE 23

*Preparation of*

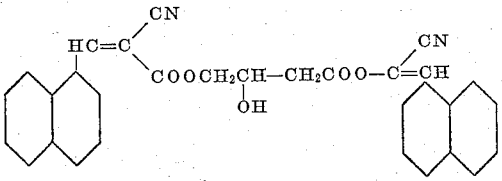

Glyceryl-1,3-bis(α-cyanoacetate) is first prepared according to the method described in Example 1 of U.S. Patent 2,426,056 except that glyceral is used as the polyhydroxy compound. One molecular equivalent of the isolated product is then condensed with 2 molecular equivalents of 2-ethoxy-1-naphthaldehyde in the manner described in Example 1, above.

EXAMPLE 24

Example 3 is repeated employing as the cyanoacetate compound:

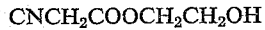

CNCH₂COOCH₂CH₂OH

EXAMPLE 25

The product of Example 24 is polyoxyalkylated with ethylene oxide employing 1% potassium hydroxide based on the weight of product used and 6 moles of ethylene oxide per mole of product in an autoclave at 80° C. The resultant reaction product contains 6 oxyethyl groups.

EXAMPLE 26

Example 25 is repeated employing 35 moles of ethylene oxide to yield a product having 35 oxyethyl groups.

EXAMPLE 27

Example 25 is repeated employing 20 moles of propylene oxide to give a product having 20 oxypropyl groups.

Examples 25–27 illustrate further compounds within the purview of this invention wherein reactive hydroxyls are reacted with an alkylene oxide or a compound functioning as an oxide such as ethylene oxide, propylene oxide, butylene oxide, butylene dioxide, cyclohexane oxide, epichlorohydrin, butadiene dioxide, isobutylene oxide, styrene oxide, and mixtures thereof and the like.

The compounds employed in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein. The most outstanding and significant achievement of the compounds used in this invention lies in the remarkable ability of these compounds to protect and stabilize nitrocellulose containing compositions, polyesters, polyethylene, and polyoxymethylene against ultra-violet light degradation. The compounds used in the compositions of this invention have been found to be at least five times as effective in such stabilizing situations as the heretofore employed hydroxybenzophenones known for such uses.

The compounds used in the present invention have also been found to be admirably suited for incorporation into the transparent or translucent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Examples 1 and 2. For direct incorporation into a film of regenerated cellulose, one may employ any of the compounds herein disclosed, and particularly those which have been polyoxylated as described, for example, in Example 17. In this instance, it is preferred to impregnate the regenerated cellulose in the gel state before final drying thereof.

Other variations in and modifications of the described processes which will be obvious to those skilled in the art can be made in this invention without departing from the scope or spirit thereof.

We claim:
1. A compound of the formula

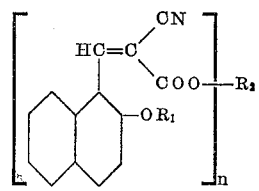

wherein $R_1$ is lower alkyl, $n$ is an integer from 1 to 2 and when $n$ is 1, $R_2$ is a radical selected from the group consisting of hydroxyalkyl, haloalkyl, cyanoalkyl, alkoxyalkyl, hydroxyalkoxyalkyl, carbalkoxyalkyl, aryl, and hetero, and when $n$ is 2, $R_2$ is a radical selected from the group consisting of alkylene of at least two carbon atoms, arylene and hetero radicals said aryl and arylene radicals being carbocyclic only and containing no more than 3 carbocycles and said hetero radicals being selected from the group consisting of furyl, tetrahydrofurfuryl, benzofuryl, thienyl, pyrryl, pyrrolidyl, 2-pyrrolidonyl, indolyl, carbazolyl, oxazolyl, thiazolyl, pyrazolyl, pyridyl, pyrimidyl, quinolyl.

2. A compound as defined in claim 1 wherein $n$ is 1 and $R_2$ is hydroxyalkyl.

3. A compound of the formula

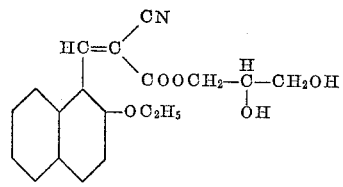

4. A compound as defined in claim 1 wherein $n$ is 1 and $R_2$ is cyanoalkyl.

5. A compound of the formula

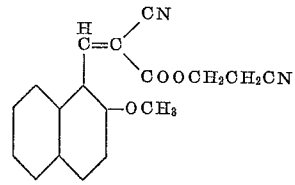

6. A compound as defined in claim 1 wherein $n$ is 1 and $R_2$ is tetrahydrofurfuryl.

7. A compound of the formula

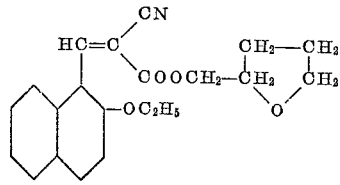

8. A compound of the formula

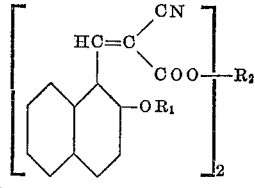

wherein $R_1$ is lower alkyl and $R_2$ is alkylene.

9. A compound of the formula
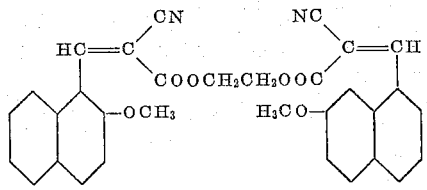
References Cited in the file of this patent
UNITED STATES PATENTS
2,849,447     Kartinos et al. _____ Aug. 26, 1948
2,914,551     Kartinos et al. _____ Nov. 24, 1959
OTHER REFERENCES
Linnell et al.: J. Chem. Soc. (London), 1953, pp. 3257–61.
Astle et al.: J. Org. Chem., vol. 21, No. 5 (1956), pages 493–6.
Fieser: Organic Chem. (3rd Ed., 1956), pages 30–31.